July 21, 1959  R. K. McCONNAUGHEY  2,895,773
VARIABLE DIAMETER TENSED RING PISTON
Filed Oct. 22, 1956  6 Sheets-Sheet 1

INVENTOR
ROBERT K. McCONNAUGHEY
BY Hall & Thompson
ATTORNEY

July 21, 1959 R. K. McCONNAUGHEY 2,895,773
VARIABLE DIAMETER TENSED RING PISTON
Filed Oct. 22, 1956 6 Sheets-Sheet 2

INVENTOR
ROBERT K. McCONNAUGHEY
BY Hall & Houghton
ATTORNEY

July 21, 1959  R. K. McCONNAUGHEY  2,895,773
VARIABLE DIAMETER TENSED RING PISTON
Filed Oct. 22, 1956  6 Sheets-Sheet 3

INVENTOR
ROBERT K. McCONNAUGHEY
BY  Hall & Houghton
ATTORNEY

July 21, 1959 R. K. McCONNAUGHEY 2,895,773
VARIABLE DIAMETER TENSED RING PISTON
Filed Oct. 22, 1956 6 Sheets-Sheet 4

INVENTOR
ROBERT K. McCONNAUGHEY
BY Hall + Houghton
ATTORNEY

July 21, 1959 R. K. McCONNAUGHEY 2,895,773
VARIABLE DIAMETER TENSED RING PISTON
Filed Oct. 22, 1956 6 Sheets-Sheet 5

INVENTOR
ROBERT K. McCONNAUGHEY

BY *Hall & Houghton*

ATTORNEY

United States Patent Office 2,895,773
Patented July 21, 1959

---

2,895,773

VARIABLE DIAMETER TENSED RING PISTON

Robert K. McConnaughey, Chevy Chase, Md.

Application October 22, 1956, Serial No. 617,467

11 Claims. (Cl. 309—23)

This invention relates to piston constructions and more particularly to plungers for hypodermic syringes and to methods of making and assembling the same.

The hypodermic plungers of the prior art suffer from many defects, among which is the inability of the plunger to adapt itself to syringe barrels of even slightly varying diameters. This failure requires that the syringe barrels be held to very close tolerances, resulting in a large percentage of rejects and greatly increasing the cost of hypodermic syringes. If the barrel size is varied even slightly, a plunger of different dimensions must be employed. Moreover, minute variations in the diameter of a single cylinder along its length result in erratic operation of the syringe and cause jamming or jumping of the plunger in the cylindrical barrel. Another defect of prior art hypodermic plungers is their inability to provide a tight enough seal with the wall of the cylinder to prevent contamination of the contents of the syringe and at the same time to maintain smooth reciprocative action. In attempting to overcome the deficiencies of the prior art, the applicant has constructed pistons having a rigid head with annular grooves into which one or more sealing rings are fitted. The present invention represents an improvement upon this basic structure.

Accordingly, it is an object of the invention to provide a relatively inexpensive means of sealing a grooved piston head or plunger shaft against the wall of a cylindrical barrel in a manner that will provide tightness of seal and smoothness of functioning at least equivalent to that achieved by using separate sealing rings fitted into annular grooves in the piston head or plunger shaft.

Another object of the invention is to provide a device of the aforesaid characteristics which can be made more readily and more cheaply to required tolerances than a plunger or piston using separate rings.

A further object of the invention is to provide a device of the aforesaid type which may be assembled more easily and cheaply than a plunger or piston using separate rings.

An additional object of the invention is to provide a device of the aforesaid type which will provide a more positive seal of the contents of the barrel against contaminants than a plunger or piston using separate sealing rings or plungers or pistons of other kinds now generally in use.

Still another object of the invention is to provide a device of the aforesaid type which will require a lesser quantity of material than solid elastic plungers or pistons of the kind now commonly used, thereby saving a significant element of cost, especially when relatively expensive silicone rubbers or relatively scarce or expensive materials are used to achieve smoother sliding action in contact with glass or plastic barrels than can be achieved with less expensive materials, or to attain other advantages not attainable with less expensive materials.

Yet another object of the invention is to provide a unique piston construction which will fit tubes of more widely varying diameters than plungers or pistons of the kinds commonly in use.

A still further object of the invention is to provide a unique piston construction which will adapt its diameter to compensate for variations in diameter during a piston stroke in a single barrel over a wider range than plungers or pistons of the kinds now commonly in use.

An additional object of the invention is to provide a plunger construction which will fit more tightly and provide a tighter seal while in a static position and still will move forward more readily and more smoothly than plungers or pistons of the kinds now commonly in use.

Another object of the invention is to provide novel methods of making and assembling pistons or plungers of the aforesaid type.

These and other objects of the invention and the manner in which such objects are accomplished will become more readily apparent in the following detailed description of the invention taken in conjunction with the accompanying drawings wherein:

Briefly, the foregoing objects of the invention are accomplished by providing a piston having a piston head on which is mounted an elastic cap having one and preferably at least two rings joined by a web. The rings are arranged to roll about shoulders formed on the piston head. The material of the piston cap may be stretched both longitudinally and radially. While the principles of the invention as set forth below are illustrated with respect to hypodermic syringes, it will be apparent to those skilled in the art that the invention will function with equal effectiveness in any device in which a piston having sealing rings of elastic material can be used.

Figure 2:
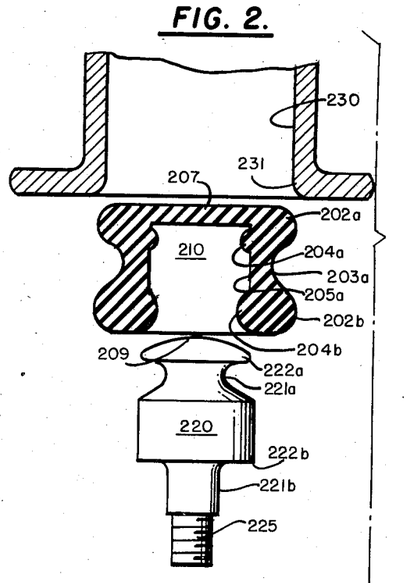
Figure 2 is an exploded view of a modification of the invention.

In order that the similarities between the various forms of the invention will be apparent, common reference numerals have been applied to corresponding portions of the various forms except that in Figure 2 and the figures which follow a key number has been placed before the respective reference numerals (for example the key number 2 in Figure 2) to associate the designated parts with a particular figure and to differentiate those parts with respect to the corresponding parts of other figures.

Figure 1:
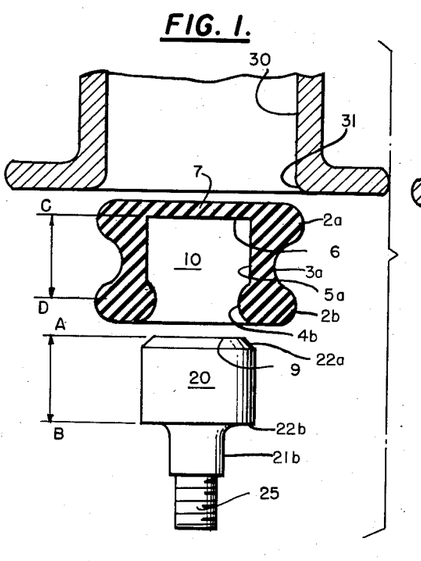
Figure 1 is an exploded cross-sectional view of the components of one form of the invention.

Referring to Figure 1, a first element of the invention is a cup-shaped piston cap 10 made of elastic material, such as rubber, and having alternate external annular ridges, rings, or protuberances 2a, 2b and an intermediate groove 3a. The elastic piston cap may also have one or more internal annular ridges or beads 4b. The piston cap is closed at one end by a web 7 encircled by ring 2a, and the material of the cap which joins the rings 2a and 2b constitutes another web.

A second element of the invention is a relatively rigid piston head or plunger head 20, which may be in generally cylindrical form, attached to or formed integrally with a piston rod 25. The piston head may be formed with a groove 21b and a pair of annular shoulders 22a, 22b. The rearward shoulder 22b is located in relation to the forward end of the piston head at 9 so as to cause the elastic material of the piston cap to be stretched longitudinally when the cap is assembled over the forward end of the piston head and is pressed forward into a cylindrical barrel 30 of suitable diameter. The piston head preferably has a maximum diameter at least equal to and preferably slightly greater than the largest inside diameter of the piston cap.

Figure 1A:
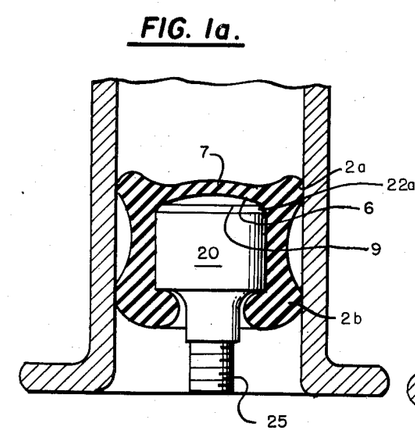
Figure 1a is a cross-sectional view of the components of Figure 1 shown assembled and ready to operate.

In the embodiment of Figure 1, the shoulder 22b in the piston head is positioned longitudinally a greater distance A—B from the forward end of the piston head than the distance C—D between the face 6 of the cavity in the piston cap and the high point of the second external annular ring 2b around the piston cap when the cap is in its normal relaxed state as shown in Figure 1, so that when the piston cap is assembled on the piston head and placed in the cylinder 30, as shown in Figure 1a, the material composing the grooved portion of the piston cap between the first ring 2a and the second ring 2b is stretched longitudinally and thereby placed in tension longitudinally.

To assemble the piston, the elastic piston cap is first placed over the forward end 9 of the piston head or plunger shaft. If the diameter of the piston head is somewhat greater than the inside diameter of the cavity of the cap, the cap is slightly stretched radially and the elastic material of which it is made is thereby placed in tension radially, so that it tends to grip the piston head. The piston head with the cap thus fitted over its forward end is then pressed forward into the tubular barrel 30 (or into a loading magazine or cylinder) the inside diameter of which is slightly less than the largest diameter of the piston cap in its relaxed state (and accordingly less to a greater degree than the diameter of the second annular ring 2b of the piston cap as it is stretched around the piston head or plunger shaft). In the absence of a flame ring around the mouth of the cylinder, the forward ring 2a tends to roll forwardly over the shoulder 22a, this action being aided by chamfering the end of the piston as shown, thereby compressing the web 7 and causing it to bulge outwardly. If a flame ring is present, the foregoing action may be assisted by manually squeezing the ring and web into this condition.

The internal surface of the piston cap stretched around the circumference of the piston head or plunger shaft is free to slide rearwardly along the surface of the piston head. Accordingly, when the plunger is pressed forward into the tubular barrel, the rearward rim 31 of the barrel presses rearwardly against the second external ring 2b of the cap, pushes it rearwardly along the surface of the piston head or plunger shaft, stretching the material of the piston cap, and pushes the second annular ring 2b behind the shoulder 22b of the piston head. There it is held locked against forward motion (off of the piston head) by the internally directed circumferential pressure of the inside wall of the barrel 30 on the elastic material of the piston cap and the externally directed circumferential pressure of the shoulder 22b of the piston head.

In view of the fact that the distance between the forward end 9 of the piston head and the shoulder 22b is greater than the distance between the bottom 6 of the cavity in the piston cap and the second ring 2b, the material in the piston cap between the first ring and the second ring is stretched longitudinally along the piston head and, therefore, being in tension longitudinally, tends continually to pull the rings back towards their normal position in relation to each other. If the parts are properly dimensioned, a return of the rings to their normal relaxed position is frustrated by the inward circumferential pressure of the inner wall of barrel 30. The effect of the tension thus induced by stretching the material of the cap between the rings is to cause the rings to press outwardly against the walls of the barrel with greater force than they would exert in their relaxed state, and thereby to provide in a static position, a relatively tighter and more positive seal than would be provided by either the piston cap in its relaxed state or a solid piston of similar elastic material having the same diameter as the piston cap.

By making the groove 21b of sufficient depth and width to leave space inwardly and rearwardly of the ring 2b when the ring is locked in the position just described by the barrel, the elastic material of the piston cap is free to flow inwardly and rearwardly into the groove 21b over the fulcrum provided by the shoulder 22b. Accordingly, if the inside diameter of the barrel is smaller than the optimum diameter, so that it compresses the rings more tightly than a barrel of optimum diameter would, a piston of the foregoing construction because of the provision for the displacement of the material of the ring 2b, is capable of adapting itself to fit the smaller barrel over a greater range of smaller than optimum diameters than is possible with individual sealing rings closely fitted into grooves or with a solid piston made of similar elastic material, neither of which provides comparable latitude for unimpeded flow of the displaced material. Conversely, because of the tendency of the stretched material of the piston cap between the rings 2a and 2b to pull the ring 2b outward and forward of the shoulder 22b, thereby increasing its diameter, and to pull the forward ring 2a outward and rearward over the forward rim 22a of the piston head, a piston of the above-described construction is capable of functioning properly in barrels of larger than optimum diameter over a wider range than pistons of more conventional type. Also, for the reasons just described, pistons constructed in accordance with the principles of the invention are capable of adapting themselves more readily and over a wider range to variations in diameter of a single barrel as the piston moves through the length of its stroke than pistons of the conventional type.

When the plunger is pressed forward, the latitude provided by the groove 21b for the flow of the material of the rearward ring inwardly and rearwardly when displaced facilities the ease with which the piston may be moved forward in the barrel as compared with solid pistons giving a comparably tight seal when static. To the extent that the friction of the ring against the inner surface of the barrel, as the plunger is pressed forward, creates a drag against the ring, it tends to pull it rearwardly along the plunger shaft. Accordingly, the ring accommodates itself to the composite forces generated by forward movement of the piston head and permits the piston to move forward with greater ease than would be possible in the case of a solid piston of similar material or a piston having sealing rings mounted tightly in grooves in the piston head, but still maintains a tight seal against a wall of the barrel.

As the piston is pressed forward into the barrel, the forward ring 2a is deflected forward, the forward membrane face or web 7 of the piston cap bulging slightly forward as shown in Figure 1a as the ring 2a is compressed and forced forwardly over the rim or shoulder 22a of the piston head. This action of the forward ring obviously tends to accentuate the stretching of the material between it and the second ring 2b and thereby to accentuate the sealing action of both rings. The flexibility of the relatively thin membrane face or web 7 of the piston cap, however, permits the material of the forward ring to be displaced readily forward around the shoulder 22a in case the barrel diameter is diminished, in much the same manner as the space inside and to the rear of the second ring 2b permits material displaced at that point to flow inwardly and rearwardly in case the barrel diameter is diminished. The action of the forward ring 20 in adapting its diameter to the diameter of the barrel is generally similar (though in opposite direction) to the action of the rearward or second ring 2b of the piston cap in tending to provide a tight seal in static position, in adapting over a relatively wide range to varying diameters in the cylinder in which the piston is used, and in easing the forward movement of the piston when the syringe is actuated, without loss of sealing effect.

Figure 2A:
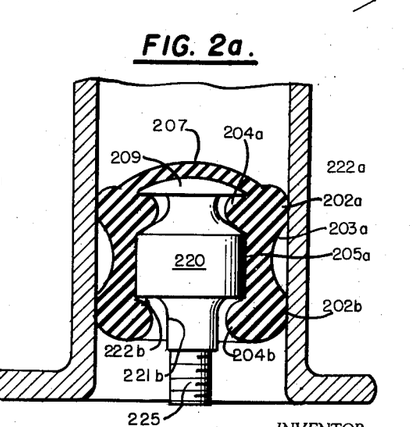
Figure 2a is an assembled view of the modification of Figure 2.

The modification illustrated in Figures 2 and 2a is basically similar to that of Figures 1 and 1a. In Figures 2 and 2a, however, the end face 209 of the piston head 220 is crowned as shown, and a groove 221a close to the forward end of the piston head is provided in addition to the previous groove 221b. The piston cap may be provided with an additional preformed inner bead 204a adjacent ring 202a, although this is not essential to effective functioning of this form. With this form of piston head, when the cap is placed over the forward end of the piston head and the piston is pressed into the barrel, the first ring 202a as well as the second 202b is pressed rearwardly, stretching the web 207 of the piston cap over the crowned end 209 of the piston head. The bead 204a enters the groove 221a, locking the forward ring 202a behind the shoulder 222a. If no preformed inner bead 204a is used, the material behind the forward ring 202a will be compressed upon assembly to form an inner bead 204a adequate to lock the forward ring 202a behind the shoulder 222a. The rearward ring 202b is locked behind the shoulder 222b as before.

The stretching of the forward face or web 207 of the piston cap by the curved end 209 of the piston head introduces additional tension tending to pull the forward ring 202a forward and tending somewhat to accentuate the sealing effect accomplished by the forward ring. The displacement of the material inside the forward ring takes place inwardly and rearwardly in case of diminution of the diameter of the barrel rather than inwardly and forwardly as in the case of the embodiment of Figures 1 and 1a. It will be noted that in its stretched condition, as illustrated in Figure 2a, the forward ring 202a lies mainly behind the shoulder 222a of the piston head, rather than mainly forward of the shoulder as illustrated in Figure 1a. Nevertheless, the relative dimensions of the head 220 and the cap 210 are selected, as in Figure 1, to provide for longitudinal tension in the material of the cap between the rings. In either case, the piston has substantially greater adaptability to varying diameters, provides an effective seal over a wider range of barrel diameters, and tends to function more smoothly when actuated than pistons of similar diameter of the types more commonly used. Both embodiments keep the rings in tension by stretching the elastic material of the piston cap between the rings to accentuate the sealing effect and provide space to accommodate material displaced by narrowing of the bore.

Figure 3:
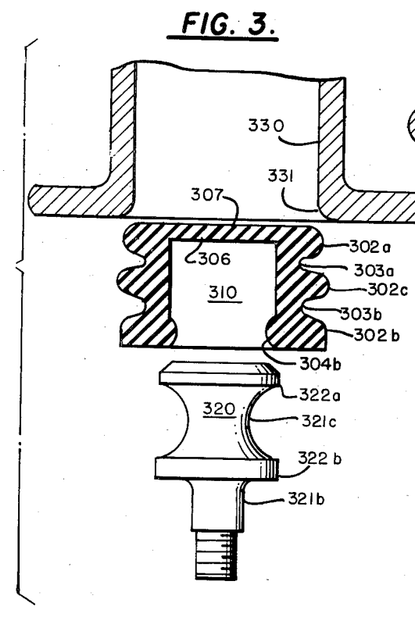
Figure 3 is an exploded view of another modification.
Figure 3A:
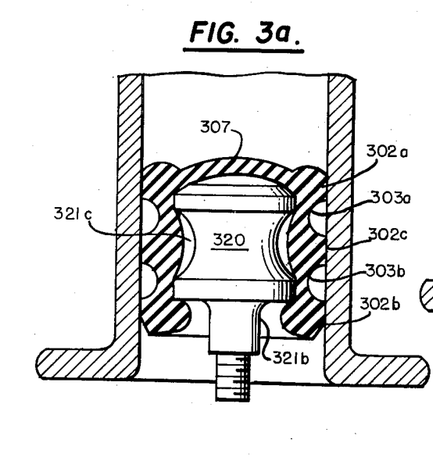
Figure 3a is an assembled view of the modification of Figure 3.

The pistons illustrated in Figures 3, 3a, 4, and 4a are basically similar to those previously described. However, each of these pistons includes a third, free floating ring 302c and 402c, respectively. Comparing the piston head 320 of Figure 3 with the corresponding piston head of Figure 1, it will be noted that an additional groove 321c is provided. As shown in Figure 3a, the intermediate or third ring 302c is suspended around the groove 321c in the piston head, and the pressure of the wall of the barrel against this intermediate free floating ring tends to accentuate the stretching of the material between the other two rings and accordingly to accentuate the pull exerted against those rings in proportion to the pressure exerted on the intermediate ring. This form of piston provides a third sealing ring where it is deemed desirable to have three points of contact between the piston and the barrel. The addition of the third ring as a free floating ring permits the use of an additional contact point between the piston and the barrel without diminishing the ease of functioning of the piston and tends to accentuate the effectiveness of the seal provided by the other rings without substantially reducing the freedom with which the piston will slide forward when actuated by the user. The amount of additional tension provided by the intermediate ring will, of course, depend upon the diameter of this ring, and the diameter may be varied to obtain any desired additional tension.

Figure 4:
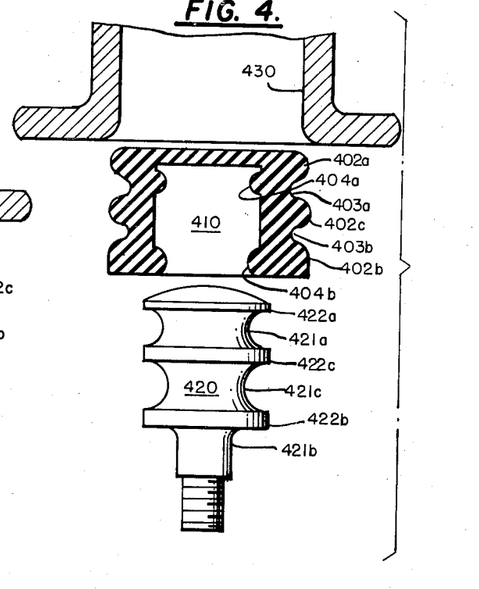
Figure 4 is an exploded view of still another modification.
Figure 4A:
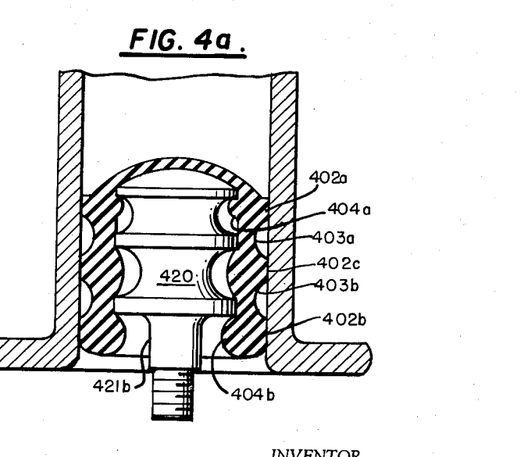
Figure 4a is an assembled view of the modification of Figure 4.

Comparing the modification of Figures 4 and 4a with that of Figures 2 and 2a, it will be noted that an additional groove 421c is provided to accommodate the material of the intermediate ring 402c. The advantages attendant this construction are the same as those set forth above.

Figure 5:
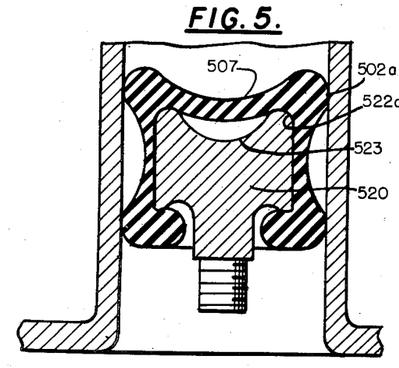
Figure 5 is a cross-sectional view of another modification of the invention shown assembled and ready to operate.
Figure 6:
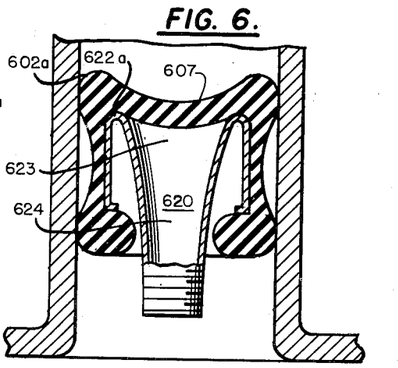
Figure 6 is a view similar to that of Figure 5 and illustrating another modification.

Figures 5 and 6 illustrate modifications in which the piston head has a concave end face which receives the end web of the piston cap. This type of construction may be applied to embodiments previously described and to other embodiments described hereinafter. In Figure 5, a solid piston head 520 having a concave end face 523 is employed. When the piston is pressed forward in the barrel, pressure against the forward membrane face or web 507 of the piston cap will bulge the web rearwardly into the concavity of the piston head, thereby exerting or accentuating a forward pull on ring 502a. This forward pull tends to facilitate forward movement of the piston by counteracting or diminishing any tendency generated by the forward movement of the piston to force the forward ring 502a rearwardly over the shoulder 522a. Such a concave forward face of the piston head has its greatest effectiveness and utility in conjunction with piston caps in which the forward ring rolls forwardly over the shoulder at the end face of the piston head.

The forward pull generated by displacing the end web of the piston cap rearwardly into the concavity of the end face of the piston head may be further accentuated by providing an air passage through the piston head. Figure 6 illustrates an embodiment in which a hollow piston head 620 formed from sheet or tube stock is employed. An air passage 624 is provided between the front face 623 of the piston head (under the web 607 of the cap) and the rear of the piston head, thereby relieving air pressure behind the web 607 which, in the absence of such a passage, would tend to limit the extent to which the web of the piston cap would be pressed rearwardly into the concavity of the piston head face.

Figure 7:
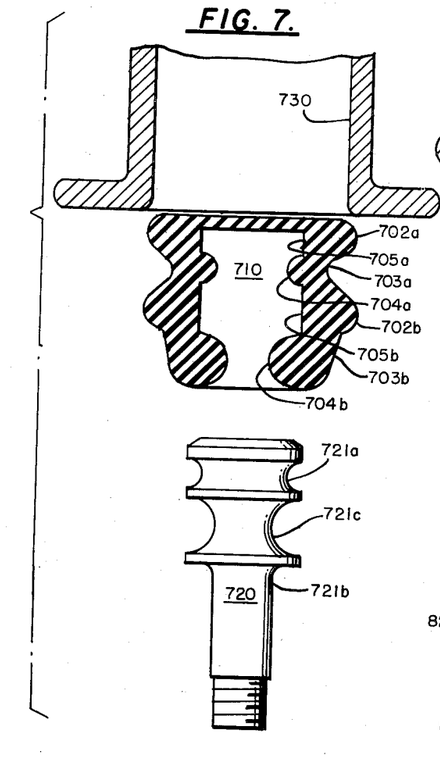
Figure 7 is an exploded view of another modification of the invention.
Figure 7A:
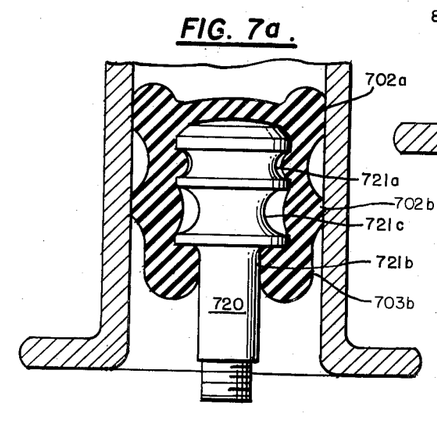
Figure 7a is an assembled view of the modification of Figure 7.

The form of the invention illustrated in Figures 7 and 7a includes means to hold the piston cap more firmly on the piston head. This embodiment employs one or more inner locking beads 704a and 704b which are staggered with respect to the rings 702a, 702b, and are located opposite grooves 721a and 721b of the piston head. In this embodiment the inner beads are relied upon to lock the piston cap on the piston head, rather than the compression of the material of the rings between the surface of the barrel and the shoulders of the piston head. A longitudinal stretching of the material between the rings is accomplished in this modification by spacing the grooves 721a and 721b in the piston head farther apart than the internal beads 704a and 704b in the cavity of the piston cap. The action of the forward ring 702a is similar to that of the forward ring 2a of Figures 1 and 1a. The outward pull on the second ring 702b is similarly exerted by the stretched material between rings, but the space for displacement of the material of the second ring under compression is provided by a groove 721c immediately under the ring, rather than by a groove adjacent the open end of the cap.

Figure 8:
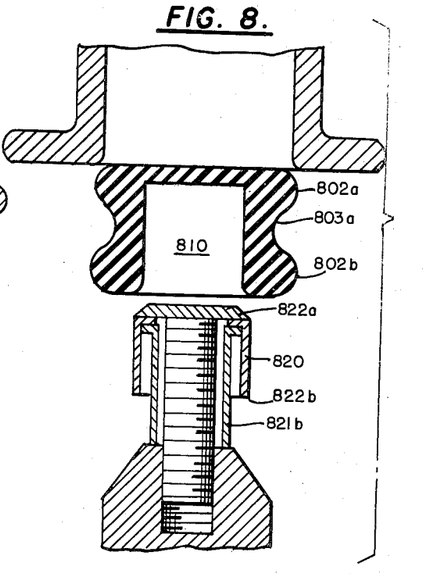
Figure 8 is an exploded view of still another modification.
Figure 8A:
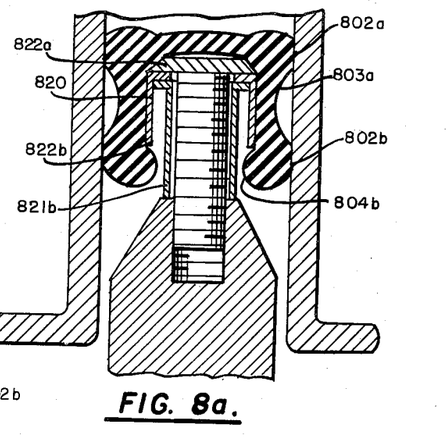
Figure 8a is an assembled view of the modification of Figure 8.

Another form of the invention, illustrated in Figures 8 and 8a, is substantially identical with that illustrated in Figures 1 and 1a except that the piston cap has no preformed inner bead under the second ring 802b. In this form of the invention, the material behind the second ring is compressed upon assembly, as illustrated in Figure 8a, to form an internal bead 840b sufficient to lock the piston cap in place. The piston head construction of Figures 8 and 8a, differs from those previously disclosed (but is similar to that of Figure 6 in that it is formed from tubular stock) and is indicative of the fact that the cap construction shown may be used with many different heads. In the various forms of the invention, solid or hollow heads may be used where appropriate, and the heads may be formed with a male or female connector for positively engaging a piston rod extension or may merely have an abutment upon which the rod may push, when it is not necessary to withdraw the piston, as in aspiration. Moreover, the piston cap construction which lacks a bead adjacent its open end is applicable to other embodiments, such as that of Figure 2, in which the forward ring lies primarily behind the forward shoulder of the piston head. Where a straight cylindrical inner cavity is used in the piston cap, however, it is preferable to have the inside diameter of the piston cap substantially smaller in relation to the diameter of the piston head than may be necessary in other modifications where the preformed internal beads aid in locking the piston cap onto the piston head.

Figure 9:
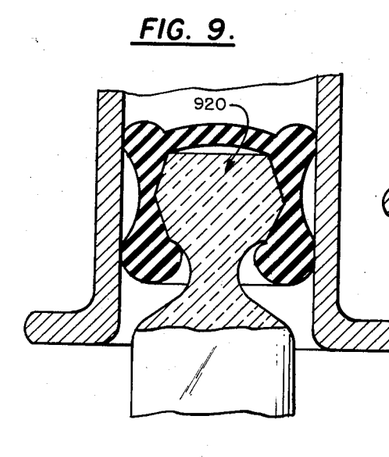
Figure 9 is a cross-sectional view of another modification of the invention shown assembled and ready to operate.

Figure 9 illustrates a form of the invention in which the tendency of the material between the rings to stretch under concentric pressure of the wall of the cylindrical container is accentuated by tapering the outer surface of the piston head 920 inwardly toward either or both extremities and by correspondingly tapering the inner surface of the piston cap. The inclined planes established by making the piston head in the form of two oppositely directed truncated cones, as shown, acting against the comparably tapered but shorter inner surfaces of the elastic piston cap when the rings of the cap are squeezed by the barrel tend to accentuate the stretching effect and consequently to increase the tension established within the material of the piston cap between the rings, thereby somewhat increasing the adaptability of the composite piston to variations in barrel diameter so as to accommodate a somewhat wider range of barrel diameters than can be accommodated if a straight cylindrical piston head is employed.

Figure 10:
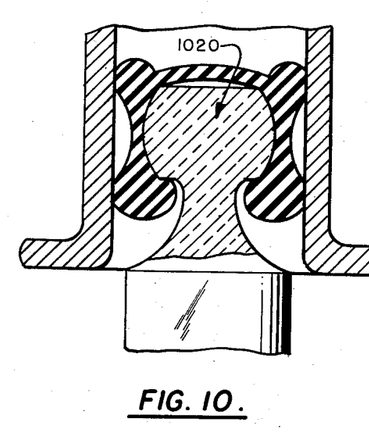
Figure 10 is a cross-sectional view of another modification similar to Figure 9.

Figure 10 illustrates a form of the invention in which the piston head 1020 has an outer surface curved convexly from the center towards the ends, instead of a flat taper as illustrated in Figure 9. The effect achieved by using a curved taper is generally similar to the effect achieved in the modification of Figure 9 in that the stretching effect is enhanced and the range and adaptability of the piston to varying diameters is increased. Here again, the radius may be confined either to the front or rear end of the piston head, if desired.

Figure 11:
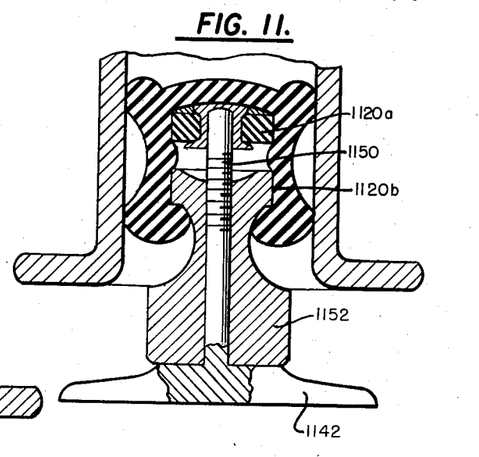
Figure 11 is a cross-sectional view of still another modification.

Figure 11 illustrates a modification of the invention having a two piece piston head 1120a, 1120b adjustable in effective length to accentuate or diminish longitudinal tension of the piston cap by lengthening or shortening the distance between the forward rim of the piston head and the rearward shoulder of the piston head. In this embodiment the piston rod 1150 integral with handle portion 1142 may be threaded into part 1120b of the piston head (and its extension 1152) and received rotatably within the part 1120a of the head. By turning the piston rod with respect to the parts of the piston head, the parts may be moved more closely together or more far apart.

Figure 12:
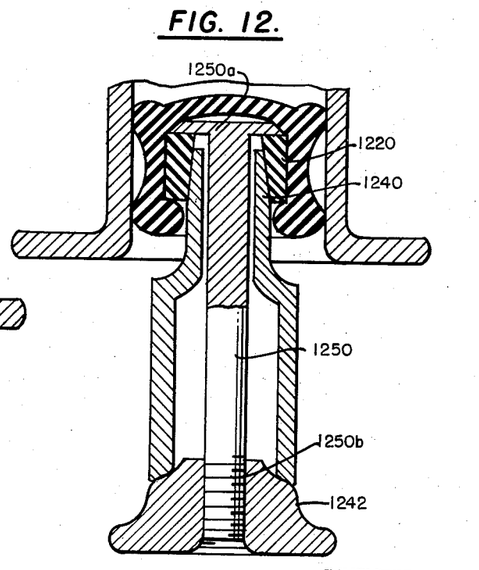
Figure 12 is a cross-sectional view of another modification.
Figure 13:
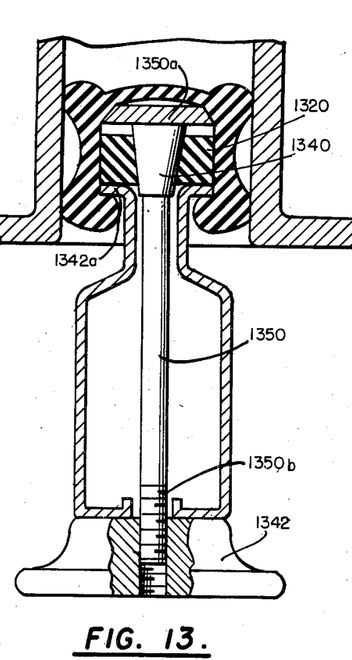
Figure 13 is a cross-sectional view of another modification.

Figures 12 and 13 illustrate piston heads having an effectively variable diameter. In Figure 12, the head comprises a ring 1220 of relatively hard but elastic material and having a tapered inner surface. A tapered insert 1240 may be moved into and out of the ring by threading the contiguous rotating handle portion 1242 onto or off of a corresponding threaded portion 1250b of the piston rod 1250, the end of which may be flattened and inserted in the piston cap before the ring 1220 as shown at 1250a. A similar construction is illustrated in Figure 13, but in this modification the piston rod 1350 is fixed to the tapered insert 1340 movable into and out of the ring shaped head 1320 by threading the end 1350b of the rod into and out of the handle portion 1342. The ring 1320 is held between the flattened end 1350a of the piston rod and the flattened end 1342a of the handle portion.

Figure 14:
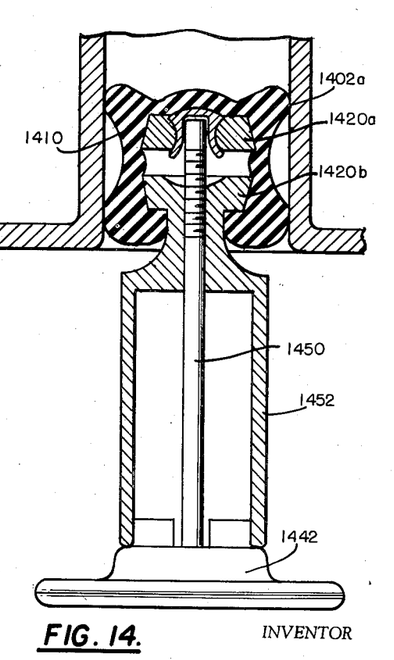
Figure 14 is a cross-sectional view of still another modification.

Figure 14 illustrates a form of the invention including means for adjusting simultaneously both the length and the effective diameter of the piston head. In this embodiment the outer surfaces of the head parts 1420a and 1420b are tapered inwardly toward the ends of the head as shown (with either a flat or a curved taper) and are mounted on the piston rod 1450 in the manner described with respect to Figure 11. The part 1420b of the piston head may be formed integrally with an outer shell 1452, and the piston rod 1450 may be integral with a handle 1442. The inner cavity of the piston cap 1410 is tapered as described with respect to Figure 11. Thus if the handle 1442 is rotated with respect to the shell 1452, the parts of the piston head will be moved relative to each other and will tend to slide against the tapered inner surfaces of the piston cap 1410. As the parts of the piston head are forced behind the portions of the piston cap under and adjacent to the rings 1402a and 1402b, these portions, which are of diminished internal diameter with respect to the central portion of the web connecting the rings, will be increased in diameter, thereby tending to press the rings more tightly against the walls of the cylinder and at the same time lengthening the head. Conversely, if the parts of the piston head are moved more closely together, they will move into the wider central internal portion of the piston cap, reducing the diameter of the portions of the cap at the rings and at the same time reducing the length of the piston head.

By the use of the supplemental adjustments provided in Figures 11, 12, 13, and 14, the diameter or length of the piston head may be varied effectively so that the range of barrel sizes in which a piston will operate satisfactorily can be broadened even beyond the extraordinary range of diameters to which the pistons of the non-adjustable type will adapt themselves. It will be apparent that piston caps other than the type illustrated in conjunction with the adjustable piston heads may be employed. These caps may be selected, for example, from any of the other piston cap embodiments illustrated and described.

Figure 15:
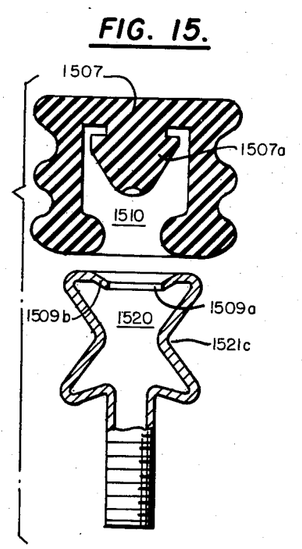
Figure 15 is an exploded view of another modification of the invention.
Figure 15A:
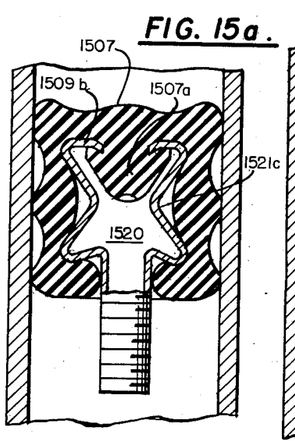
Figure 15a is an assembled view of the modification of Figure 15.
Figures 16, 16A, 17, 17A:
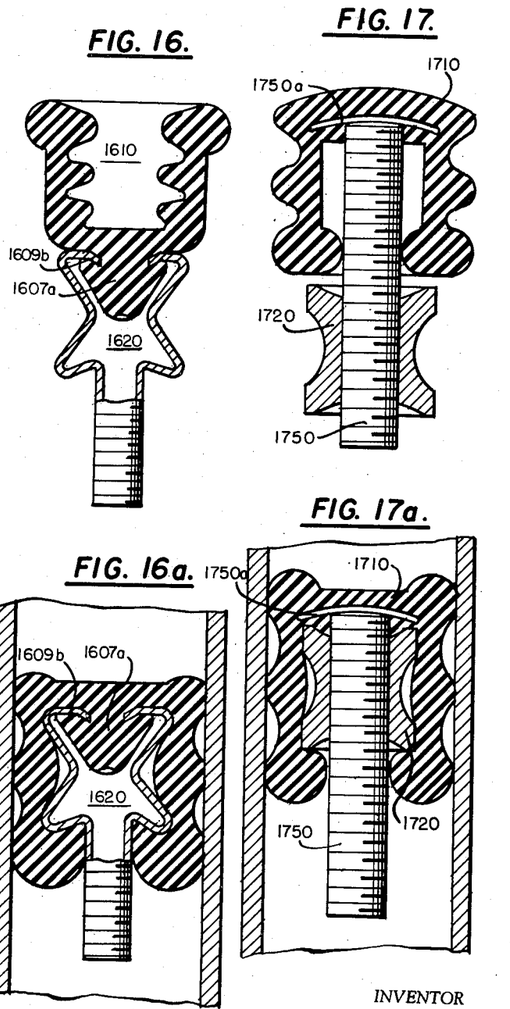
Figure 16 is an exploded view of another modification of the invention.
Figure 16a is an assembled view of the modification of Figure 16.
Figure 17 is a cross-sectional view of still another modification of the invention shown partially assembled.
Figure 17a is a cross-sectional view of the modification of Figure 17 shown fully assembled.

Figures 15 through 17 illustrate forms of the invention in which the attachment of the piston cap to the piston head is facilitated and the risks of the piston cap stripping from the piston head when the plunger is withdrawn against negative pressure are diminished by having integral attaching means formed in the forward end of the piston. In Figure 15, the piston head 1520 is hollow and may be formed from tubular or sheet stock. This form of the invention is illustrated in conjunction with a piston cap having three rings, and accordingly, the piston head is narrowed at its middle to provide a groove 1521c as described previously. The end of piston head is provided with an aperture 1509a, and the surrounding material of the end face forms an inner shoulder 1509b. The end web 1507 of the piston cap is provided with an inwardly extending mushroom shaped projection 1507a. The projection has a maximum diameter greater than that of the aperture 1509a of the piston head but has a short portion adjacent the inner face of the web 1507 of reduced diameter. The projection may be forced through the aperture 1509a so that it rests against shoulder 1509b, as shown in Figure 15a, by virtue of the resiliency of the piston cap material, or the piston cap may be molded with the projection interiorly of the piston head.

In the form illustrated in Figure 16, the piston cap 1610 may be formed with the projection 1607a outwardly directed therefrom and the normally external rings inwardly thereof. The projection 1607a may be forced through the corresponding aperture in the piston head or it may be molded into the piston head. The piston cap may then be folded back over the piston head as shown in Figure 16a.

In the embodiment illustrated in Figure 17, the piston cap 1710 may be molded over a threaded piston rod 1750, so that the flattened end 1750a of the rod is embedded in the end web of the piston cap, and the piston head 1720 may be in the form of an internally threaded sleeve which may be threaded onto the piston rod and into the cavity of the piston cap, as shown in Figure 17a. It will be apparent that the principles of the construction of Figures 15 through 17 may be applied to other types of piston head and piston cap constructions.

By virtue of the piston constructions described above, it will be apparent to those skilled in the art that pistons are provided which may be employed in barrels varying more widely in inside diameter than would be possible using solid pistons of similar material or pistons having individual sealing rings mounted tightly enough in grooves to provide a firm seal. Such adaptability of the piston constructions of the invention to a wider range of barrel diameters permits the use of pistons of one diameter (for both the cap and the piston head) with barrels made from standard glass tubing less carefully selected as to tolerances than is required with pistons of conventional type. Thus, costs are greatly diminished and other difficulties commonly encountered in matching barrels and pistons in order to combine in the final instrument an adequate seal and suitable ease of functioning are eliminated. Pistons constructed in accordance with the principles of the invention will achieve their purpose with a lesser quantity of elastic material than is required to make solid pistons of similar diameter that will function effectively. Accordingly, the invention facilitates the use of silicone rubbers or other expensive materials at relatively less material cost than would be required to make solid pistons of such material.

Because the piston cap may be locked onto the piston head by the pressure of the surrounding barrel, or by its own elastic forces, the cost of mounting into the piston a metal attachment shaft or other means for attaching the piston rod to the piston, as is commonly done in the case of solid elastic pistons, may be avoided.

Piston caps for use in accordance with the teachings of the invention can be formed to adequately close tolerances in multiple cavity molds through established modern processes and accordingly can be made more cheaply than O rings (or other types of sealing rings dimensioned to sufficiently close tolerances to provide comparably consistent functioning) can be made. The piston heads of the invention can be made easily and cheaply by any of numerous well known methods of forming a rod or shaft with annular grooves or a rearwardly facing shoulder. The piston caps can be assembled to the piston heads with greater ease and less cost than separate sealing rings can be fitted into grooves in the piston head or plunger shaft.

Because piston caps constructed in accordance with the invention have a forward face composed of the material of which the piston cap is made, these pistons seal more effectively the chamber of the container in which they are used against the ingress of contaminants from the rear than is possible when separate O rings or other sealing rings are mounted in grooves in the piston head. In pistons of the latter type, any contaminants that might work under the rings where the rings fit in the grooves would thereby reach the inside of the container, whereas contaminants that might work their way under the rings of a piston of the present invention would still be sealed off from the chamber of the container by the forward wall of the piston cap.

While there are described and illustrated herein what are now believed to be preferred embodiments of the invention, it will be apparent to those skilled in the art that modifications can be made in such embodiments without departing from the principles and spirit of the invention, the scope of which is defined in the appended claims. Accordingly, the embodiments illustrated and described are to be considered exemplary rather than restrictive of the invention, and those modifications which lie within the meaning and range of equivalency of the claims are included therein.

What is claimed is:

1. In a piston construction adapted to move within a cylinder, a generally cylindrical piston head having a diameter less than the inner diameter of the cylinder and an elastic cap on said piston head stretched both longitudinally and radially over the surface of said piston head and arranged to engage the inner surface of said cylinder, said cap having at least two spaced external rings extending therearound and connected by a tubular elastic web stretched therebetween, said piston head having an annular shoulder contiguous to each of the rings, said shoulders forming fulcrums supporting the respective rings for rotation therearound when the piston is moved in said cylinder, the outer diameter of said rings being greater than the inner diameter of said cylinder and each said rings as a whole being thus constrained by said cylinder to rotate around said shoulders and assume positions offset along the length of said piston head from the positions assumed in the absence of constraint by said cylinder, there being space for inward movement of said rings at said offset positions, whereby said rings may rotate inwardly and outwardly around said shoulders in conformity with variations in the diameter of said cylinder.

2. The construction of claim 1, said cap having an end web beyond the forward end of said piston head, one of said rings encircling said end web and being constrained by said cylinder to assume a forward position beyond said forward end, said end web being buckled by the constraint on said forward ring.

3. The construction of claim 2, said piston head having a groove near its rear end, and the other of said rings surrounding said groove.

4. The construction of claim 3, said cap having an internal annular bead surrounding said groove with free play to move therein when said piston is in said cylinder.

5. The construction of claim 1, said piston head having a convex forward end, said cap having an end web stretched over said forward end and encircled by one of said rings, said piston head having an annular groove rearward of said forward end, and the last-mentioned ring surrounding said groove.

6. The construction of claim 5, said cap having an internal annular bead surrounding said groove with free play to move therein.

7. The construction of claim 1, said piston head having at least one annular groove between said shoulders, said cap having at least one external cylinder-contacting ring intermediate said pair of rings and surrounding said groove.

8. The construction of claim 7, said piston head having a convex forward end, said cap having an end web stretched over said forward end and encircled by one of said rings, said piston head having an annular groove rearward of said forward end, and the last-mentioned ring surrounding said groove.

9. The construction of claim 1, said piston cap having an annular internal bead and said piston head having a groove into which said bead extends.

10. The construction of claim 1, the forward end of said piston head being depressed, and said cap having an end web overlying said forward end.

11. The construction of claim 10, said piston head having an air passage extending rearwardly from the forward end.

References Cited in the file of this patent

UNITED STATES PATENTS

| | | |
|---|---|---|
| 291,690 | Clarke | Jan. 8, 1884 |
| 577,682 | Eissner | Feb. 23, 1897 |
| 1,165,686 | McElroy | Dec. 28, 1915 |
| 1,586,337 | Stockwell | May 25, 1926 |
| 2,394,687 | Hein | Feb. 12, 1946 |
| 2,592,381 | Blackman | Apr. 8, 1952 |
| 2,688,325 | Lockhart | Sept. 7, 1954 |
| 2,695,613 | MacGregor | Nov. 30, 1954 |
| 2,847,996 | Cohen et al. | Aug. 19, 1958 |